UNITED STATES PATENT OFFICE 2,332,623

PROTECTIVE COATING

Irwin C. Clare, Elmhurst, Del., assignor to Hercules Powder Company, Wilmington, Del., a corporation of Delaware No Drawing. Application February 28, 1941,
Serial No. 381,132

11 Claims. (Cl. 106—222)

This invention relates to protective coating compositions and to methods for the preparation thereof. More particularly, it relates to the types of varnish compositions known as gloss oils and rosin varnishes and to methods for the production thereof.

Rosin in its unmodified form possesses certain disadvantages when incorporated in a protective coating. The resulting film tends to be soft and tacky as large quantities of this ingredient are used. Remedies have been suggested to overcome these objectionable features, and one which has received wide acceptance is that of hardening the rosin before its incorporation in the coating composition by reacting it with a metallic oxide such as calcium oxide, zinc oxide, etc., in small quantities at an elevated temperature. Actually, any oxide of any metal of group two of the periodic table may be used to accomplish this end. Also, hydroxides and certain salts of these metals may be used. In commercial practice, however, calcium hydroxide, zinc oxide, and magnesia are commonly used, and the process is familiarly referred to as "liming" the rosin.

It has been found, however, that the above-described process, when it is used in the making of a gloss oil in particular, does not give the desired water resistance. Since gloss oils are often used in conjunction with bodied oils, etc., in the making of wall paints which are frequently subjected to washing, the lack of water resistance is very undesirable.

Furthermore, when pale wood rosins are "limed," and the resulting products made into protective coating compositions, these compositions have excellent color. The color of these compositions is far superior to that of compositions prepared with gum rosin. Unfortunately, it is impossible to obtain as high viscosities using wood rosin as with gum rosin at comparable solids content. For this reason, in spite of the better color of wood rosin protective coating compositions, their use has been greatly retarded.

When the above described process is used in the making of an oil varnish, a product results which is wanting in alkali resistance, even though its water resistance has been greatly improved by the addition of substantial quantities of a drying oil. Many coatings are regularly subjected to washing with soap having a high alkali content, and in other cases the coatings come in contact with stronger detergents. Hence, the question of alkali resistance of a coating composition is of no little importance. Then, it is an ever-present problem to increase the drying time and the bodying rate of this particular type of protective coating composition.

It is an object of this invention to produce a protective coating composition which has an improved water resistance as compared with the ordinary "limed" rosin coating composition.

It is another object to produce a protective coating composition having a heavier consistency which is obtainable in shorter time than is possible by the use of ordinary "limed" rosin in such a composition.

A further object is to produce a protective coating composition of better color than that obtainable in ordinary "limed" rosin compositions.

A still further object is to produce a protective coating composition having better alkali resistance than the compositions of the prior art possess.

It is also an object to produce a protective coating composition which will have better drying characteristics and which will yield films of improved hardness as compared with those of the prior art.

Other objects will appear hereinafter.

The above objects are accomplished in this instance by subjecting a polymerized rosin to reaction with a compound of a metal of group two of the periodic table at an elevated temperature and including it as an essential ingredient in the protective coating composition. The compounds which are operable generally comprise the oxides, the hydroxides, and the acetates. Other salts which are operable in specific instances include the borates and the sulfates. For example, zinc sulfate can be used in the reaction, whereas calcium sulfate cannot. Although any of the aforesaid compounds of metals of group two of the periodic table may be employed, it is preferred that calcium, magnesium or zinc compounds be employed. It is further preferred that calcium, if used, be employed in the form of the hydroxide; that magnesium, if used, be employed in the form of the oxide; and that zinc, if used, be employed in the form of the oxide.

The resulting resinates produced by the above reaction are characterized by their being water-insoluble. It has been found that when they are used as a resinous ingredient in protective coatings, the properties of the coatings are greatly improved. The protective films formed upon application of these compositions to suitable surfaces have improved water resistance, improved alkali resistance, and better color when compared with the prior art compositions. The liquid compositions themselves have been found to possess heavier consistencies, obtainable in less time than with the use of unpolymerized rosin.

Although it is contemplated in accordance with the present invention that the inventive thought herein contained is comprehensive to protective coating compositions generally, it will be realized that the first step in preparing any composition is the production of a base varnish or non-pigmented composition from which a pigmented composition may later be made. Hence, even though, hereinafter, the process as described and the specific embodiments go no further than the production of a base varnish, it will be realized that it is not the intent to limit this invention thereto.

It is realized, furthermore, that in the manufacture of gloss oils and "limed" rosin varnishes, generally, slightly different processes are used. The usual distinction made between the two is that the former may contain up to 4 gallons of drying oil per 100 lbs. of resin and still be considered a gloss oil. Any varnish composition containing more oil is an oil varnish. Hence, it can be seen that the use of comparatively large amounts of drying oil in the one with practically none in the other would call for different cooking procedures. This will be brought out in the specific embodiments of the invention. It is believed, however, that the broad underlying principle above disclosed is common to them both.

According to this invention, then, a quantity of a polymerized rosin, a quantity of a drying oil and a quantity of a compound of a metal of group two of the periodic table are reacted together in a suitable vessel at an elevated temperature. If desired, no drying oil need be used, and the resulting product will fit in the category of a gloss oil. Several variations are possible in accomplishing the reaction of the constituents. For example, the polymerized rosin may be first heated and the metallic compound then added. This procedure is particularly desirable in producing gloss oils. If desired, the drying oil may first be heated, the metallic oxide added, and the polymerized rosin thereafter introduced. Another variation is to heat the polymerized rosin, drying oil and metallic compound in an admixture. Still different procedures may be used. It is only required that the resulting composition be finally in a substantially homogeneous state with the metallic oxide completely reacted with the other ingredients. In accomplishing this result a temperature of at least about 400° F. and preferably within the range of from about 400° F. to about 620° F. will be used.

If an oil varnish is being prepared, the composition, along with any drying oil which may not have originally been added, will be further heated at a temperature of at least about 400° F., and preferably at a temperature within the range of from about 450° F. to about 620° F. The exact temperature used will depend upon the polymerized rosin employed and the particular resin which may be used in conjunction with it. The time required for the mixture to be held at the particular temperature will depend upon the viscosity desired.

After the desired body has been obtained, the mixture is allowed to cool to a temperature low enough to avoid excessive evaporation of the thinning solvent, usually about 440° F., and is then thinned to a consistency suitable for application. After the addition of a drier, the material is suitable for use as a clear coating. If it is desired to produce a pigmented coating, the desired pigment or pigments, and the drier may be ground into the clear coating described heretofore.

The non-pigmented coating compositions made in accordance with my invention may contain a drying oil or mixture of several drying oils in an amount not greater than about 100 gallons per 100 lbs. of total resin content. The exact proportion of oils, if used, will depend upon the characteristics desired in the final film. For the majority of uses, the quantity of oils used will be within the range of from about 10 gallons to about 70 gallons per 100 lbs. of total resin content. The amount of volatile solvent added to secure the desired consistency is controlled by the types of resins and oils used, the conditions of cooking, etc., and will usually be added in an amount within the range of from about 25% to about 70% of the total non-pigmented coating composition.

The polymerized rosins which may be treated in accordance with this invention may be those derived from any of the various grades of wood or gum rosin. It is contemplated that there be included, too, the various resin acids produced from said rosins, such as, abietic, pimaric, sapinic, sylvic, etc. acids. The polymerization may be carried out according to any of the known methods, such as, for example, by treatment with various catalysts, as sulfuric acid, boron trifluoride, stannic chloride, zinc chloride, aluminum chloride, hydrofluoric acid, etc., or by treatment of the rosins with a high voltage, high frequency discharge or by treatment with an acid sludge formed by treatment of rosin with sulfuric acid. The polymerization of rosin by any of these methods is usually carried out with the rosin dissolved in some suitable organic solvent, such as gasoline, benzol, etc. It is desirable, in general, to use a polymerized rosin which has been obtained from a rosin from which most of the color bodies have been removed by prior treatment. Furthermore, it is contemplated that the polymerized rosins of the present invention include those that have, after polymerization, been further refined by means of selective solvents, such as, furfural, etc., and also by means of adsorbents, such as, fuller's earth, etc. This refined rosin may be further refined by a bleach treatment, such as, subjecting the rosin to the action of zinc and sodium bisulfate, heat and carbon dioxide, etc.

These polymerized rosins are characterized by their having a melting point as determined by the drop method which is increased over that of ordinary rosin and which may be as high as 176° C. and an acid number within the range of from about 120 to about 165. It is preferred, however, to use a polymerized rosin which has a melting point as determined by the drop method of from about 90° C. to about 135° C. and an acid number of from about 135 to about 165. The polymerized rosins having melting points ranging from about 135–176° C. are obtained by reduced pressure distillation of the polymerized rosin resulting from the treatment with catalysts as hereinbefore described. The unpolymerized portion of the rosin is thereby either partially or completely removed. Also, when rosin is polymerized by means of $H_2SO_4$, a highly polymerized rosin separates as a sludge. This sludge varies in drop melting point from 120 to 155° C. and in acid number from 120–130. It is contemplated that this material be used in the processes of this invention.

Generally, the amount of metallic compound used in the preparation of the protective coatings will be such as to not exceed the reaction limitations of the polymerized rosin used. When calcium hydroxide in particular is used, it is preferred that not more than about 7% by weight of this material be used; and when zinc oxide is used, it is preferred that not more than about 4% by weight of this material be used, based on the weight of the polymerized rosin. It is sometimes desirable to use compounds of several of the metals falling within group two in the preparation of a single base varnish. In such a case the amounts of each used will vary depending upon the particular compounds employed, and care must be taken such that the reaction limitations of the polymerized rosin are not exceeded.

In conjunction with the use of a compound of a metal of group two, there may, if desired, be used a relatively small proportion of a hydroxide, carbonate, or bicarbonate of a metal of group one. For example, sodium carbonate, sodium bicarbonate, and sodium hydroxide may be so employed. The use of these materials tends to increase the solubility of the polymerized rosin reaction product in the drying oils employed.

Many different resins may be used in conjunction with the necessary resinous component in the coating compositions, for example, fossil resins, such as kauri, pontianak, manila, congo, east india, black east india, etc.; natural resins, such as damar, etc.; synthetic resins, such as the phenol formaldehyde type, the glyptal type, the maleate type resins, etc. may be used.

The drying and semi-drying oils which may be used include the following: linseed, China wood, dehydrated castor, safflower, sunflower, walnut, perilla, fish, soybean, corn, cotton seed, rape seed, oiticica, etc. Prior to the use of these oils they may be heat bodied to eliminate objectionable flow characteristics in the finished product.

Various solvents may be used within the oil resin mixture, the most usual ones being petroleum solvents such as mineral spirits, V. M. & P. naphtha, etc.; wood and gum turpentine; aromatic hydrocarbons such as benzol, toluol, Hiflash naphtha, etc.; and cyclic hydrocarbons such as Solvesso #2. Any of the known driers may be incorporated in the varnishes including the resinates, linoleates, naphthenates, etc., and particularly the lead, manganese and cobalt salts thereof.

The following examples are illustrative of the specific embodiments of this invention. Examples 1 and 2 show the production of gloss oils whereas Examples 3 and 4 are directed to the preparation of oil varnishes. All parts and percentages are by weight unless otherwise indicated.

*Example 1*

The following raw material formula was used:

| | Parts |
|---|---|
| Polymerized rosin | 35,000 |
| Calcium hydroxide | 1,950 |
| Calcium acetate | 35 |

The rosin used was polymerized by treatment with $H_2SO_4$ and thereafter bleached with $NaHSO_4$ and zinc. It had a drop melting point of 98° C. and an acid number of 156. This rosin was heated to 450° F. over a period of 20–25 minutes. The calcium acetate was added and the calcium oxide thereafter slowly sifted in. The temperature was then raised to 525° F. where it was held for 60 minutes. The material was weighed and reduced to 60% solids with mineral spirits at approximately 450° F.

An equivalent gloss oil was prepared using the identical procedure as above with the exception that WW gum rosin was used in place of polymerized rosin. The constants of this preparation are compared with those of the gloss oil produced from polymerized rosin in the following table:

| | Polymerized rosin varnish | WW rosin varnish |
|---|---|---|
| Viscosity-Gardner-Holdt | U+ | S |
| Color Hellige | 5 | 6L |
| Acid number | 44 | 45 |

The polymerized rosin gloss oil of Example 1 along with several other polymerized rosin gloss oils were tested in comparison with the standard gloss oil made with WW gum rosin for comparative water resistance. Films were cast on glass and after being dried for 24 hours, they were immersed in cold water for 20 hours. The WW gum rosin gloss oil film had blushed very badly whereas the polymerized rosin gloss oil films were all in good condition. It will be seen from the above table, too, that in addition to the great improvement in water resistance the polymerized rosin also produced a gloss oil of heavier consistency and better color than did the WW gum rosin.

*Example 2*

The following raw material formula was used:

| | Parts |
|---|---|
| Polymerized rosin | 400 |
| Calcium hydroxide | 16 |
| Zinc oxide | 6 |
| Zinc acetate | 4 |

The rosin used was a sulfuric acid polymerized rosin which had been further bleached by heat treatment accompanied by a $CO_2$ sparge. It had a drop melting point of 97° C. and an acid number of 153. The rosin was heated to 450° F. in a suitable container. The zinc acetate was added and the zinc oxide slowly sifted in while the temperature was increased to 525° F. After the zinc had completely reacted with the resin, the calcium hydroxide was slowly sifted in. The mixture was then held at 525° F. for 30 minutes after the lime had completely reacted. The solids were weighed and reduced to a 60% solution with mineral spirits. The resulting product had a viscosity (Gardner-Holdt) of T and a color (Hellige) of 5L. A comparison gloss oil was prepared using N wood rosin. This product had a viscosity of H and a color of 5, thereby demonstrating that the polymerized rosin had definitely produced a higher viscosity and a lighter colored product.

*Example 3 and 4*

Two limed polymerized rosin varnishes were made using the following raw material formula:

| Raw material | A | B |
|---|---|---|
| | | Parts |
| Tung oil | 70.2 | 234 |
| Nonbreak perilla oil | 135 | |
| Nonbreak soybean oil | 67.5 | |
| Heat-bodied linseed oil | | 48 |
| Polymerized rosin | 200 | 200 |
| Calcium hydroxide | 14 | 14 |
| Calcium acetate | 0.2 | 0.2 |
| Lead acetate | | 2.2 |
| Manganese linoleate (8% Mn) | 4.7 | 4.8 |
| Lead naphthenate (24% Pb) | 5.7 | |
| Cobalt naphthenate (6% Co) | 0.9 | 0.9 |
| Mineral spirits | 387 | 482 |

The polymerized rosin used in the preparation of these varnishes was made with sulfuric acid catalyst followed by a zinc sodium bisulfate bleach. It had the following analysis:

Acid number .............................. 157.5
Color (Lovibond) ......................... 19A
Melting point (drop) .................° C.. 100

In preparing the varnish of raw material composition A, all of the oil with the exception of 30 parts of perilla oil was heated to 350° F. A slurry of 30 parts of perilla oil with the calcium hydroxide and the calcium acetate was made and added to the remainder of the heated oil. Heating was continued to 400° C. at which temperature the mixture was held until the soaps settled. The polymerized rosin was then added and heating continued to 565° F. at which temperature the mixture was held until a drop formed a soft pill. The temperature was allowed to drop to 440° F. at which point the manganese linoleate was added. The product was thinned and the naphthenic driers incorporated therein.

In preparing the varnish of raw material composition B, the polymerized rosin, 78 parts of tung oil, the calcium hydroxide and calcium acetate were intimately mixed with heating to 450° F. and held at that temperature until a drop on glass showed the material to be clear. The balance of the tung oil was added and heating continued to 565° F. At this temperature the material was held for body until a cold drop formed a medium hard pill, after which the linseed oil was added. This material was held at 525° F. until a medium hard pill was again formed. The lead acetate was added, the material cooled to approximately 450° F., thinned and the remaining driers added.

The above varnishes showed better drying properties than did those formulated with unpolymerized rosins. To test the alkali resistance of these varnishes as compared with similarly prepared rosin varnishes, samples were flowed on steel panels, suitably dried, and subjected to both 1 and 3% caustic soda solutions. Visual inspection of the panels at intervals shown the resistance of the polymerized rosin varnishes to be definitely better than that of the unpolymerized rosin varnishes.

The above examples show the improved properties inherent in the compositions of the instant invention. These compositions present features which heretofore have not been obtainable in comparatively inexpensive protective coatings. They are particularly useful in the field of interior finishing where coating compositions which have good color, fast drying characteristics and a sufficiently heavy consistency are required. Since they provide coatings which have at least moderately good alkali and water resistance, their advent has filled an important gap in the protective coating field.

It will be understood that the details and examples hereinbefore set forth are illustrative only and that the invention as broadly described and claimed is in no way limited thereby.

What I claim and desire to protect by Letters Patent is:

1. A varnish comprising the reaction product of a polymerized rosin having an acid number of between about 120 and about 165 and a drop melting point between about 90° and about 176° C. and a compound of a metal of group 2 of the periodic table, which metal forms a water-insoluble resinate; and a spirit solvent, said varnish being characterized by water and alkali resistance.

2. A varnish comprising the reaction product of a polymerized rosin having an acid number of between about 120 and about 165 and a drop melting point between about 90° and about 176° C. and not more than 7% of said rosin of a compound of a metal of group 2 of the periodic table, which metal forms a water-insoluble resinate; and a spirit solvent, said varnish being characterized by water and alkali resistance.

3. A varnish comprising the reaction product of a polymerized rosin having an acid number of between about 120 and about 165 and a drop melting point between about 90° and about 176° C. and a compound of a metal of group 2 of the periodic table, which metal forms a water-insoluble resinate; and a mineral spirit solvent, said varnish being characterized by water and alkali resistance.

4. A varnish comprising the reaction product of a polymerized rosin having an acid number of between about 120 and about 165 and a drop melting point between about 90° and about 176° C. and a compound of a metal of group 2 of the periodic table, which metal forms a water-insoluble resinate; and turpentine, said varnish being characterized by water and alkali resistance.

5. A varnish comprising the reaction product of a polymerized rosin having an acid number of between about 120 and about 165 and a drop melting point between about 90° and about 176° C. and a compound of a metal of group 2 of the periodic table, which metal forms a water-insoluble resinate; and an aromatic hydrocarbon solvent, said varnish being characterized by water and alkali resistance.

6. A varnish comprising the reaction product of a polymerized rosin having an acid number of between about 120 and about 165 and a drop melting point between about 90° and about 176° C., a compound of a metal of group 2 of the periodic table, which metal forms a water-insoluble resinate; a drying oil, and a spirit solvent, said varnish being characterized by water and alkali resistance.

7. A varnish comprising the reaction product of a polymerized rosin having an acid number of between about 120 and about 165 and a drop melting point between about 90° and about 176° C., a compound of a metal of group 2 of the periodic table, which metal forms a water-insoluble resinate; a drying oil, and a spirit solvent, said varnish being characterized by water and alkali resistance, and said drying oil being present in an amount between 4 gallons and 100 gallons per 100 pounds of rosin.

8. A varnish comprising the reaction product of a polymerized rosin having an acid number of between about 120 and about 165 and a drop melting point between about 90° and about 176° C. and not more than 7% of said rosin of calcium hydroxide; and a spirit solvent, said varnish being characterized by water and alkali resistance.

9. A method for the preparation of a water and alkali resistant varnish which comprises reacting a polymerized rosin having an acid number between about 120 and about 165, a melting point between about 90° C. and about 176° C., and a compound of a metal of group 2 of the periodic table which metal forms a water-insoluble resinate at a temperature between about 400° F. and about 620° F. and subsequently dissolving the composition in a spirit solvent.

10. A method for the preparation of a water and alkali resistant varnish which comprises reacting a polymerized rosin having an acid number between about 120 and about 165, a melting point between about 90° C. and about 176° C., and a compound of a metal of group 2 of the periodic table which metal forms a water-insoluble resinate; and drying oil at a temperature between about 400° F. and about 620° F. and subsequently dissolving the composition in a spirit solvent.

11. A method for the preparation of a water and alkali resistant varnish which comprises reacting a polymerized rosin having an acid number between about 120 and about 165, a melting point between about 90° C. and about 176° C., and a compound of a metal of group 2 of the periodic table, which metal forms a water-insoluble resinate at a temperature between about 400° F. and about 620° F. for about one hour and subsequently dissolving the composition in a spirit solvent.

IRWIN C. CLARE.